United States Patent
Kasperchik et al.

(10) Patent No.: US 7,582,408 B2
(45) Date of Patent: Sep. 1, 2009

(54) COLOR FORMING COMPOSITIONS WITH A FLUORAN LEUCO DYE HAVING A LATENT DEVELOPER

(75) Inventors: Vladek Kasperchik, Corvallis, OR (US); Jayprakash C. Bhatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/796,630

(22) Filed: Apr. 27, 2007

(65) Prior Publication Data

US 2008/0269049 A1 Oct. 30, 2008

(51) Int. Cl.
*G03F 7/00* (2006.01)
*G03F 7/004* (2006.01)

(52) U.S. Cl. ............... 430/270.1; 430/19; 430/138; 430/945; 430/944; 430/270.15

(58) Field of Classification Search ............. 430/270.1, 430/19, 138, 945, 944, 270.15
See application file for complete search history.

(56) References Cited

U.S. PATENT DOCUMENTS

| | | | |
|---|---|---|---|
| 4,639,271 A | 1/1987 | Brunea et al. | |
| 5,243,052 A | 9/1993 | Taylor et al. | |
| 5,948,727 A * | 9/1999 | Hotta et al. | 503/200 |
| 6,060,223 A | 5/2000 | Nohr et al. | |
| 6,143,480 A | 11/2000 | Obayashi et al. | |
| 6,172,001 B1 * | 1/2001 | Hotta et al. | 503/201 |
| 6,432,610 B1 | 8/2002 | Rentzepis et al. | |
| 6,890,614 B2 | 5/2005 | Gore et al. | |
| 6,891,038 B2 | 5/2005 | Krongauz et al. | |
| 6,958,181 B1 | 10/2005 | Gore | |
| 7,018,953 B2 | 3/2006 | Gore et al. | |
| 7,141,360 B2 | 11/2006 | Kasperchik et al. | |
| 7,148,182 B2 | 12/2006 | Field et al. | |
| 7,169,542 B2 * | 1/2007 | Kasperchik et al. | 430/343 |
| 7,390,610 B2 * | 6/2008 | Day | 430/270.1 |
| 2004/0146812 A1 * | 7/2004 | Gore et al. | 430/343 |
| 2004/0147399 A1 | 7/2004 | Gore | |
| 2004/0174399 A1 * | 9/2004 | Wu et al. | 345/863 |
| 2005/0053863 A1 | 3/2005 | Gore | |
| 2005/0137088 A1 | 6/2005 | Hayakawa et al. | |
| 2005/0274274 A1 | 12/2005 | Gore et al. | |
| 2006/0009356 A1 | 1/2006 | Muryama et al. | |
| 2006/0068315 A1 | 3/2006 | Gore | |
| 2006/0078832 A1 * | 4/2006 | Gore et al. | 430/332 |
| 2006/0093958 A1 | 5/2006 | Kasperchik et al. | |
| 2006/0147833 A1 | 7/2006 | Kasperchik et al. | |

FOREIGN PATENT DOCUMENTS

EP 0716135 6/1996

OTHER PUBLICATIONS

Masahiko Inouye, et al, New Thermo-Response Dyes: Coloration by the Claisen Rearrangement and Intramolecular Acid-Base Reaction, Angewandte Chemie, 104(2), pp. 198-200 (1992).
International Search Report; PCT Patent Application No. PCT/US2008/061628, filed Apr. 25, 2008; search issued by Korean Patent Office (ISA) Sept. 22, 2008.

* cited by examiner

*Primary Examiner*—Amanda C. Walke

(57) ABSTRACT

Compositions and systems for production of color images with a fluoran leuco dye having a latent developer are disclosed and described. A color forming composition or composite can include a polymer matrix, a thermally modifiable fluoran leuco dye having a latent developer attached thereto, and a radiation absorber. The thermally modifiable fluoran leuco dye can be developable upon the color forming composition being contacted with electromagnetic radiation which causes the radiation absorber to become energized, so that the energized radiation absorber causes the latent developer to undergo rearrangement to produce an intermediate dye form having a phenolic substituent. The intermediate dye can then undergo an acid catalyzed ring opening to produce a colored dye form.

24 Claims, No Drawings

COLOR FORMING COMPOSITIONS WITH A FLUORAN LEUCO DYE HAVING A LATENT DEVELOPER

BACKGROUND OF THE INVENTION

Compositions which produce a color change upon exposure to energy in the form of light or heat are of great interest in producing images on a variety of substrates. Optical disks represent a significant percentage of the market for data storage of software as well as of photographic, video, and/or audio data. Typically, optical disks have data patterns embedded thereon that can be read from and/or written to one side of the disk, and a graphic display or label printed on the other side of the disk.

In order to identify the contents of the optical disk, printed patterns or graphic display information can be provided on the non-data, or label, side of the disk. The patterns or graphic display can be both decorative and provide pertinent information about the data content of the disk. In the past, commercial labeling has been routinely accomplished using screen-printing methods. While this method can provide a wide variety of label content, it tends to be cost ineffective for production of less than about 400 customized disks because of the fixed costs associated with preparing a stencil or combination of stencils and printing the desired pattern or graphic display.

In recent years, the significant increase in the use of optical disks for data storage by consumers has increased the demand to provide customized labels to reflect the content of the optical disk. Most consumer available methods of labeling are limited to either handwritten descriptions which lack professional appearance, quality and variety, or preprinted labels which may be affixed to the disk, but which can also adversely affect the disk performance upon spinning at high speeds.

Recently, color forming compositions have been developed which can be developed using energy sources such as lasers in order to form an image. However, these color forming compositions are often useful for only very specific applications and have a limited color palette. For this and other reasons, the need still exists for color forming compositions which increase the available options for such imaging systems.

DETAILED DESCRIPTION OF THE PREFERRED EMBODIMENT(S)

Reference will now be made to exemplary embodiments and specific language will be used herein to describe the same. It will nevertheless be understood that no limitation of the scope of the invention is thereby intended. Alterations and further modifications of the inventive features described herein and additional applications of the principles of the invention as described herein, which would occur to one skilled in the relevant art and having possession of this disclosure, are to be considered within the scope of the invention. Further, before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a radiation absorber" includes reference to one or more of such materials.

As used herein, the term "color forming composition" typically includes a color former, a radiation absorber, and a polymer matrix. These components can work together upon exposure to radiation to develop the color former to produce a dye having color or a change in color. For purposes of the present invention, the term "color" or "colored" can refer to change in visible absorbance that occurs upon development, including development to black, white, or traditional colors. An undeveloped color former can be colorless or may have some color which changes upon development to a different color. Additionally, the term "color forming composite" refers to a multi-layered color forming composition.

As used herein, the term "color former" refers generally to any composition which changes color upon application of energy. For purposes of the present invention, the term "color former" can refer to fluoran leuco dyes, including fluoran leuco dyes having a latent developer attached thereto.

As used herein, "developing," "development," or the like refers to an interaction or reaction which affects the fluoran leuco dye to produce a visible change in color through reduction to the corresponding colored leuco dye. Most often, the leuco dye is reduced to form a color or black.

As used herein, "radiation absorber" refers generally to a radiation sensitive agent that can generate heat or otherwise transfer energy to surrounding molecules upon exposure to radiation at a specific wavelength. When admixed with or in thermal contact with a fluoran leuco dye having a latent developer, a radiation absorber can be present in sufficient quantity so as to produce energy sufficient to at least partially develop the fluoran leuco dye.

As used herein, "an image data source" refers to a component of a color forming development system that selectively directs electromagnetic radiation from an electromagnetic radiation source to a coated color forming composition or composite.

As used herein, "thermal contact" refers to the spatial relationship between an absorber and a color forming composition. For example, when an absorber is heated by interaction with laser radiation, the energy generated by the absorber should be sufficient to cause the fluoran leuco dye of the color forming composition to undergo rearrangement and/or become colored, through one or more chemical reactions. Thermal contact can include close proximity between an absorber and a color forming composition, which allows for energy transfer from the absorber toward the fluoran leuco dye. Thermal contact can also include actual contact between an absorber and color former, such as in immediately adjacent layers, or in an admixture including both constituents.

As used herein, the term "spin-coatable" when referring to a composition includes a liquid carrier having various components dissolved or dispersed therein. In some embodiments, the spin-coatable composition can comprise a fluoran leuco dye, uncured polymer matrix material, and a radiation absorber in a common liquid carrier. In other embodiments, fewer components can be present in a liquid carrier forming the spin-coatable composition. Color forming compositions can be spin-coatable in one embodiment, or can be configured for other application methods as well, e.g., printing such as offset, ink-jet, gravure, roller coating, screen printing, spraying, or other application methods known to those skilled in the art.

As used herein, "optical disk" is meant to encompass audio, video, multi-media, and/or software disks that are machine readable in a CD and/or DVD drive, or the like. Examples of optical disk formats include writeable, recordable, and rewriteable disks such as DVD, DVD-R, DVD-RW, DVD+R, DVD+RW, DVD-RAM, CD, CD-ROM, CD-R, CD-RW, HD DVD, BLU-RAY, and the like. Other like formats may also be included, such as similar formats and formats to be developed in the future.

As used herein, "graphic display" can include any visible character or image found on an optical disk or other substrate. With an optical disk, the graphic display is found prominently on one side, though this is not always the case.

As used herein, "data" is typically used with respect to the present disclosure to include the non-graphic information contained on the optical disk that is digitally or otherwise embedded therein. Data can include audio information, video information, photographic information, software information, and the like.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that it would be advantageous to develop color forming compositions suitable for development over a wide variety of applications. In accordance with this, the present invention is drawn to compositions and systems having a fluoran leuco dye having a latent developer. It is noted that when discussing a fluoran leuco dye composition or a system having a fluoran leuco dye, each of these discussions can be considered applicable to each of these embodiments, whether or not they are explicitly discussed in the context of that embodiment. Thus, for example, in discussing the radiation absorbers present in a color forming composition, those radiation absorbers can also be used in a system or method for labeling with a color former, and vice versa.

In accordance with the present invention, a color forming composition or composite can include a polymer matrix, a thermally modifiable fluoran leuco dye having a latent developer attached thereto, and a radiation absorber. The thermally modifiable fluoran leuco dye can be developable upon the color forming composition being contacted with electromagnetic radiation which causes the radiation absorber to become energized, so that the energized radiation absorber causes the latent developer to undergo rearrangement to produce an intermediate dye form having a phenolic substituent. The intermediate dye can then undergo an acid catalyzed ring opening to produce a colored dye form.

Additionally, a system for labeling a substrate can include an image data source, a substrate having a color forming composition coated thereon, as previously described, and an electromagnetic radiation source operatively connected to the image data source and configured to direct electromagnetic radiation to the color forming composition at a frequency to cause the radiation absorber to generate enough heat to form the colored dye form.

Further, a method of labeling an optical disk can comprise providing a optical disk having a color forming composition coated thereon, and directing electromagnetic energy from an electromagnetic radiation source onto the color forming composition at a wavelength and power level for a sufficient amount of time to cause the radiation absorber to generate enough heat to form the colored dye form. In this embodiment, the color forming composition can be as described above.

Specific color formers, radiation absorbers, and other components of the color forming composition can each affect the development properties and long-term stability of the color forming composition and are discussed in more detail below.

Color Former

Color forming compositions of the present invention can include a color former dispersed within, adjacent to, or solvated in a polymer matrix. In one embodiment, the color former is substantially insoluble, but dispersed, in the polymer matrix and exists distinct from the polymer matrix, though this is not required. In another embodiment, the color former can be solvated in the polymer matrix as a single phase. These types of compositions can be formed by any known method such as mixing, rolling, or the like. By dispersing or solvating the color former within the polymer matrix, such a configuration allows for increased contact of the fluoran leuco dye with energy transfer materials, which are discussed below in more detail. Further, such compositions of color former dispersed or solvated within the polymer matrix can be formed as a single homogenous composition, e.g., a paste, which can then be coated on a substrate in a single step. The amount of color former dispersed or solvated within the polymer matrix can vary considerably depending on the concentration and type of color former used, as well as a number of other factors such as desired development speed, desired color intensity of developed color former, and the like. However, as a general guideline, the color former in the polymer matrix can be present at from about 2 wt % to about 40 wt %, and in some cases from about 10 wt % to about 30 wt %. Alternatively, the color former and polymer matrix can be formed in adjacent separate layers.

The color former can include a wide variety of fluoran leuco dyes. Almost any known fluoran leuco dye can be used, as long as the color development criteria discussed herein are met. For purposes of the present invention, suitable fluoran leuco dyes can have an allyloxy substituent attached to an aromatic structure. For example, the following formula represents one possible fluoran leuco dye structure that could be used with the systems, methods, and compositions described herein:

Formula 1

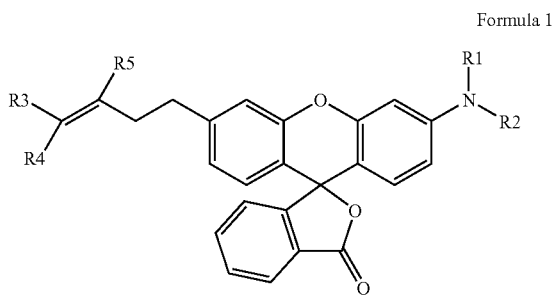

where R1, R2, R3, R4, and R5 are independently lower alkyl substituents, e.g., C1 to C8, or hydrogen. In one aspect, the alkyl substituents can have 1 to 10 carbons.

In one embodiment, color formers of the present invention can be devoid of activators or developers as separate molecules within the composition, since the fluoran leuco dyes described herein can undergo a rearrangement reaction to produce a phenolic substituent that provides the proton used in the acid catalyzed ring opening reaction, i.e., the fluoran leuco dyes of this particular structure type can self develop. In other words, the fluoran leuco dyes contain a latent developer, and thus, there is no need for a separate "developer" within the composition, though this is not precluded. As such, the color former can be present in one phase with the other components of the color forming composition.

The following reaction scheme illustrates a fluoran leuco dye of the present invention, and its ability to self develop through a Claisen aromatic rearrangement followed by an acid catalyzed ring opening:

Formula 2

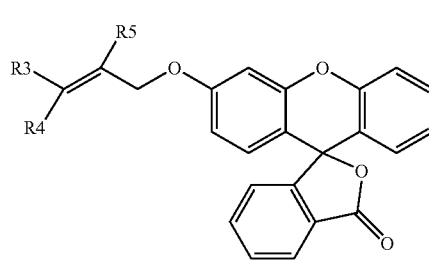

Fluoran Leuco Dye
Having a Latent Developer Substructure

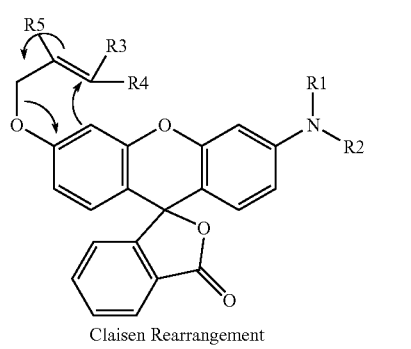

Claisen Rearrangement

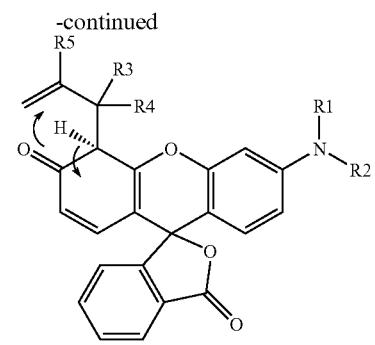

Claisen Rearomatization

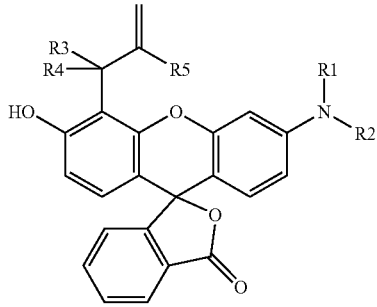

Intermediate Dye Form

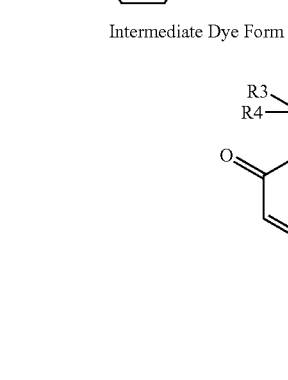

Colored Dye Form

The above reaction scheme is merely illustrative of one type of fluoran leuco dye that can be used in the compositions, methods, and systems of the present invention and is no way intended to be limiting. Additionally, without intending to be bound by any particular theory, the above reaction scheme is generally understood as one possible pathway where a fluoran leuco dye can develop into its colored form. It is noted also that the fluoran leuco dyes of the present invention can include allyloxy substituent(s) attached to an aromatic structure.

Suitable fluoran based leuco dyes that can be used include in the present invention include any fluoran dyes modified from the following structure:

Formula 3

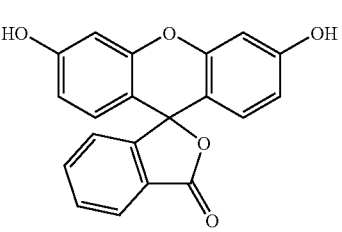

The structure in Formula 3 can be modified to a structure as shown in Formula 1 or Formula 2 above. Other modifications may be performed as well, including aromatic substitution, e.g., with alkyl or amines groups. In one embodiment, the modification can be through a hydroxy substituent or an aromatic hydrogen.

Typically, the fluoran leuco dye can be present in color forming compositions of the present invention at from about 1 wt % to about 50 wt %. Although amounts outside this range can be successfully used, depending on the other components of the composition, amounts from about 5 wt % to about 30 wt % or 10 wt % to 20 wt % frequently provide adequate results.

As the color former is self-developing, the color forming composition need not have a separate phase for a traditional developer. Therefore, the color former composition of the present invention can include the fluoran leuco dye, a polymer matrix, and a radiation absorber, as well as other additives, solvated in a single phase. As such, the color former composition can have a viscosity below 100 cps and can be spin-coatable.

Additional materials can also be included with the color former in the composition such as, but not limited to, stabilizers, anti-oxidants, non-leuco colorants, radiation absorbers, and the like.

Radiation Absorber

A radiation absorber can be included in the color forming composition as a component which can be used to develop the color forming composition upon exposure to radiation at a predetermined exposure time and/or wavelength.

The radiation absorber can act as an energy antenna, providing energy to surrounding areas upon interaction with an energy source. As a predetermined amount of energy can be provided by the radiation absorber, matching of the radiation wavelength and intensity to the particular absorber used can be preferable.

Various radiation absorbers can act as an antenna to absorb electromagnetic radiation of specific wavelengths and ranges. In accordance with the present invention, the wavelength can be from about 200 nm to about 1100 nm. Therefore, the present invention can provide color forming compositions for use in devices that emit wavelengths within this range. The compositions, methods, and systems of the present invention can use radiation absorbers that are commercially available. One skilled in the art will recognize that any number of combinations of radiation absorbers and dyes may be used in the present invention.

The radiation absorber can be configured to be in a heat-conductive relationship with the fluoran leuco dyes of the present invention. For example, the radiation absorber can be included with the color former and/or the polymer matrix. Alternately, the radiation absorber can be in a separate layer. Thus, the radiation absorber can be admixed with or in thermal contact with the latent developer-modified fluoran leuco dye. Additionally, the radiation absorber can be admixed with or in thermal contact with the polymer matrix. In one aspect, the radiation absorber can be present with both the color former and the polymer matrix in a single phase. In this way, substantially the entire color forming composition in an exposed area can be heated quickly and substantially simultaneously. Alternatively, the radiation absorber can be applied as a separate layer which can be optionally spin-coatable or screen-printable.

Consideration can also be given to choosing the radiation absorber such that any light absorbed in the visible range does not adversely affect the graphic display or appearance of the color forming composition either before or after development.

A radiation absorber suitable for use in the present invention can include, but is not limited to, aluminum quinoline complexes, porphyrins, porphins, indocyanine dyes, phenoxazine derivatives, phthalocyanine dyes, polymethyl indolium dyes, polymethine dyes, guaiazulenyl dyes, croconium dyes, polymethine indolium dyes, metal complex IR dyes, cyanine dyes, squarylium dyes, chalcogeno-pyryloarylidene dyes, indolizine dyes, pyrylium dyes, quinoid dyes, quinone dyes, azo dyes, and mixtures or derivatives thereof. Other suitable antennas can also be used in the present exemplary system and method and are known to those skilled in the art and can be found in known publications.

Accordingly, in one embodiment, antenna dyes that may be used to selectively sensitize the above-mentioned coating to a wavelength of between approximately 400 nm and 600 nm include, but are in no way limited to, cyanine and porphyrin dyes such as etioporphyrin 1 (CAS 448-71-5), phthalocyanines and naphthalocyanines such as ethyl 7-diethylaminocoumarin-3-carboxylate ($\lambda$ max=418 nm). Specifically, according to one exemplary embodiment, appropriate antenna dyes include, but are in no way limited to, aluminum quinoline complexes, porphyrins, porphins, and mixtures or derivatives thereof. Non-limiting specific examples of suitable radiation absorber antenna can include 1-(2-chloro-5-sulfophenyl)-3-methyl-4-(4-sulfophenyl)azo-2-pyrazolin-5-one disodium salt ($\lambda$max=400 nm); ethyl 7-diethylaminocoumarin-3-carboxylate ($\lambda$max=418 nm); 3,3'-diethylthiacyanine ethylsulfate ($\lambda$max=424 nm); 3-allyl-5-(3-ethyl-4-methyl-2-thiazolinylidene) rhodanine ($\lambda$max=430 nm) (each available from Organica Feinchemie GmbH Wolfen), and mixtures thereof.

Non-limiting specific examples of suitable aluminum quinoline complexes can include tris(8-hydroxyquinolinato) aluminum (CAS 2085-33-8), and derivatives such as tris(5-cholor-8-hydroxyquinolinato)aluminum (CAS 4154-66-1), 2-(4-(1-methyl-ethyl)-phenyl)-6-phenyl-4H-thiopyran-4-ylidene)-propanedinitril-1,1-dioxide (CAS 174493-15-3), 4,4'-[1,4-phenylenebis(1,3,4-oxadiazole-5,2-diyl)]bis N,N-diphenyl benzeneamine (CAS 184101-38-0), bis-tetraethylammonium-bis(1,2-dicyano-dithiolto)-zinc(II) (CAS 21312-70-9), 2-(4,5-dihydronaphtho[1,2-d]-1,3-dithiol-2-ylidene)-4,5-dihydro-naphtho[1,2-d]1,3-dithiole, all available from Syntec GmbH.

Non-limiting examples of specific porphyrin and porphyrin derivatives can include etioporphyrin 1 (CAS 448-71-5), deuteroporphyrin IX 2,4 bis ethylene glycol (D630-9) available from Frontier Scientific, and octaethyl porphrin (CAS 2683-82-1), azo dyes such as Mordant Orange (CAS 2243-76-7), Merthyl Yellow (CAS 60-11-7), 4-phenylazoaniline (CAS 60-09-3), Alcian Yellow (CAS 61968-76-1), available from Aldrich chemical company, and mixtures thereof.

Further, in order to sensitize the above-mentioned coating to a radiation wavelength of approximately 650 nm, many indolium of phenoxazine dyes and cyanine dyes, such as cyanine dye CS172491-72-4, may be selectively used in the above-mentioned coating. Additionally, dyes having absorbance maximums at approximately 650 nm may be used including, but in no way limited to many commercially available phthalocyanine dyes such as pigment blue 15.

Further, radiation absorbing antenna dyes having absorbance maximums at approximately 650 nm according to their extinction coefficient that may be selectively incorporated into the present antenna dye package to reduce the power level initiating a color change in the coating include, but are in no way limited to, dye 724 (3H-Indolium, 2-[5-(1,3-dihydro-3,3-dimethyl-1-propyl-2H-indol-2-ylidene)-1,3-pentadienyl]-3,3-dimethyl-1-propyl-, iodide) ($\lambda$max=642 nm), dye 683 (3H-Indolium, 1-butyl-2-[5-(1-butyl-1,3-dihydro-3,3-dimethyl-2H-indol-2-ylidene)-1,3-pentadienyl]-3,3-dimethyl-, perchlorate (λ max=642 nm), dyes derived from phenoxazine such as Oxazine 1 (Phenoxazin-5-ium, 3,7-bis(diethylamino)-, perchlorate) (λmax=645 nm), available from "Organica Feinchemie GmbH Wollen." Appropriate antenna dyes applicable to the present exemplary system and method may also include but are not limited to phthalocyanine dyes with light absorption maximum at/or in the vicinity of 650 nm.

Examples of antenna dyes suitable for imaging with 780 nm laser radiations include, but are not limited to:

a) IR-780 iodide, (Aldrich 42,531-1) (1) (3H-indolium, 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propyl-, iodide(9Cl));

b) IR783 (Aldrich 54,329-2) (2) (2-[2-[2-Chloro-3-[2-[1,3-dihydro-3,3-dimethyl-1-(4-sulfobutyl)-2H-indol-2-ylidene]-ethylidene]-1-cyclohexen-1-yl]-ethenyl]-3,3-dimethyl-1-(4-sulfobutyl)-3H-indoliumhydroxide, inner salt sodium salt);

c) 3H-Indolium, 2-[2-[2-chloro-3-[(1,3-dihydro-1,3,3-trimethyl-2H-indol-2-ylidene)ethylidene]-1-cyclopenten-1-yl]ethenyl]-1,3,3-trimethyl-, salt with 4-methylbenzenesulfonic acid (1:1) (9Cl)-(Lambda max-797 nm), CAS No. 193687-61-5 (available from "Few Chemicals GMBH" as S0337);

d) 3H-Indolium, 2-[2-[3-[(1,3-dihydro-1,3,3-trimethyl-2H-indol-2-ylidene)ethylidene]-2-[(1-phenyl-1H-tetrazol-5-yl)thio]-1-cyclohexen-1-yl]ethenyl]-1,3,3-trimethyl-, chloride (9Cl) (Lambda max-798 nm), CAS No. 440102-72-7 (available from "Few Chemicals GMBH" as S0507);

e) 1H-Benz[e]indolium, 2-[2-[2-chloro-3-[(1,3-dihydro-1,1,3-trimethyl-2H-benz[e]indol-2-ylidene)ethylidene]-1-cyclohexen-1-yl]ethenyl]-1,1,3-trimethyl-, chloride (9Cl) (Lambda max-813 nm), CAS No. 297173-98-9 (available from "Few Chemicals GMBH" as S0391);

f) 1H-Benz[e]indolium, 2-[2-[2-chloro-3-[(1,3-dihydro-1,1,3-trimethyl-2H-benz[e]indol-2-ylidene) ethylidene]-1-cyclohexen-1-yl]ethenyl]-1,1,3-trimethyl-, salt with 4-methylbenzenesulfonic acid (1:1) (9Cl) (Lambda max—813 nm), CAS No. 134127-48-3 (available from "Few Chemicals GMBH" as S0094, also known as Trump Dye or Trump IR); and g) 1H-Benz[e]indolium, 2-[2-[2-chloro-3-[(3-ethyl-1,3-dihydro-1,1-dimethyl-2H-benz[e]indol-2-ylidene)ethylidene]-1-cyclohexen-1-yl]ethenyl]-3-ethyl-1,1-dimethyl-, salt with 4-methylbenzenesulfonic acid (1:1) (9Cl) (Lambda max—816 nm), CAS No. 460337-33-1 (available from "Few Chemicals GMBH" as S0809).

In addition, the radiation absorbing compound can include phthalocyanine or naphthalocyanine IR dyes such as Silicon 2,3-naphthalocyanine bis(trihexylsiloxide) (CAS No. 92396-88-8) (Lambda max—775 nm) and proprietary naphthalocyanine NIR dyes from "Yamamoto Chemicals" YKR-1031 (extinction max at 771 nm), YKR-3072 (extinction max at 774 nm), YKR-3071 (extinction max at 788 nm).

Similarly, high sensitivity/lower stability radiation absorbing antenna dyes having absorbance maximums at approximately 808 nm that may be incorporated into the present coating include, but are in no way limited to, Indocyanine dyes such as 3H-Indolium, 2-[2-[2-chloro-3-[(1,3-dihydro-1,3,3-trimethyl-2H-indol-2-ylidene)ethylidene]-1-cyclopenten-1-yl]ethenyl]-1,3,3-trimethyl-, salt with 4-methylbenzenesulfonic acid (1:1) (9Cl), (Lambda max—797 nm), CAS No. 193687-61-5, available from "Few Chemicals GMBH" as S0337; 3H-Indolium, 2-[2-[3-[(1,3-dihydro-1,3,3-trimethyl-2H-indol-2-ylidene) ethylidene]-2-[(1-phenyl-1H-tetrazol-5-yl)thio]-1-cyclohexen-1-yl]ethenyl]-1,3,3-trimethyl-, chloride (9Cl), (Lambda max—798 nm), CAS No. 440102-72-7 available from "Few Chemicals GMBH" as S0507; 1H-Benz[e]indolium, 2-[2-[2-chloro-3-[(1,3-dihydro-1,1,3-trimethyl-2H-benz[e]indol-2-ylidene)ethylidene]-1-cyclohexen-1-yl]ethenyl]-1,1,3-trimethyl-chloride (9Cl), (Lambda max—813 nm), CAS No. 297173-98-9 available from "Few Chemicals GMBH" as S0391; 1H-Benz[e]indolium, 2-[2-[2-chloro-3-[(1,3-dihydro-1,1,3-trimethyl-2H-benz[e]indol-2-ylidene)ethylidene]-1-cyclohexen-1-yl]ethenyl]-1,1,3-trimethyl-, salt with 4-methylbenzenesulfonic acid (1:1) (9Cl), (Lambda max—813 nm), CAS No. 134127-48-3, available from "Few Chemicals GMBH" as S0094, also known as Trump Dye or Trump IR; and 1H-Benz[e]indolium, 2-[2-[2-chloro-3-[(3-ethyl-1,3-dihydro-1,1-dimethyl-2Hbenz[e]indol-2-ylidene)ethylidene]-1-cyclohexen-1-yl]ethenyl]-3-ethyl-1,1-dimethyl-, salt with 4-methylbenzenesulfonic acid (1:1) (9Cl) (Lambda max—816 nm), CAS No. 460337-33-1, available from "Few Chemicals GMBH" as S0809.

In order to achieve a visible contrast between developed areas and non-imaged or non-developed areas of the coating, the color former can be chosen to form a color that is different than that of the background. For example, color formers having a developed color such as black, blue, red, magenta, and the like can provide a good contrast to a more yellow background. Optionally, an additional non-color former colorant can be added to the color forming compositions of the present invention or the substrate on which the color forming composition is placed. Any known non-color former colorant, e.g., standard dyes and/or pigments, can be used to achieve almost any desired background color for a given commercial product.

Generally, the radiation absorber can be present in the color forming composition (or adjacent layer) in an amount of from about 0.001 wt % to about 10 wt %, and typically, from about 0.5 wt % to about 1 wt %, although other weight ranges may be desirable depending on the activity of the particular absorber.

Polymer Matrix

The color forming compositions of the present invention can typically include a polymer matrix which acts primarily as a binder. As mentioned above, the color former can be dispersed within or otherwise carried by the polymer matrix. Various polymer matrix materials can influence the development properties of the color forming composition such as development speed, light stability, and wavelengths which can be used to develop the composition. Acceptable polymer matrix materials can also include, by way of example, UV curable polymers such as acrylate derivatives, oligomers, and monomers, such as included as part of a photo package. A photo package can include a light absorbing species which initiates reactions for curing of a lacquer. Such light absorbing species can be sensitized for curing using UV or electron beam curing systems, such as, by way of example, benzophenone derivatives. Other examples of photoinitiators for free radical polymerization monomers and pre-polymers can include, but are not limited to, thioxanethone derivatives, anthraquinone derivatives, acetophenones, and benzoine ethers.

In particular embodiments of the invention, it can be desirable to choose a polymer matrix which is cured by a form of radiation that does not also develop the color former or otherwise decrease the stability of the color forming composition at the energy input and flux necessary to cure the coatings. Thus, the polymer matrix can be curable at a curing wavelength which is substantially different than the wavelength of electromagnetic radiation used to develop the color former.

Further, a suitable photoinitiator should also have light absorption band which is not obscured by the absorption band of the radiation absorber, otherwise the radiation absorber can interfere with photoinitiator activation and thus prevent cure of the coating. Therefore, in one practical embodiment, a photoinitiator light absorption band can lie within the UV region, e.g., from about 200 to about 400 nm, and the absorber band lies from about 400 to about 1100 nm. However, in practice these bands can overlap. A working system design is possible because the energy flux required for development of a color former is about ten times higher than needed for initiation of the cure. In yet another embodiment, the absorber has a dual function, curing the UV curable polymer (relatively low energy flux) and developing the color former (higher energy flux). This is possible because the energy flux during cure is typically an order of magnitude lower than needed for developing the color former.

UV curable oligomers and monomers that can be used in the present invention include, without limitation, acrylates and styrenes. For example, specific UV curable oligomers and monomers include, without limitation, isobornyl methacrylate, isobornyl acrylate, dicyclopentadienyl acrylate, dicyclopentadienyl methacrylate, cyclohexyl (meth)acrylate, cyclohexyl acrylate, cyclohexyl (meth)acrylate, dicyclopentanyl (meth)acrylate, tert-butyl acrylate, tert-butyl methacrylate, dicyclopentenyloxyethyl (meth)acrylate, dicyclopentenyloxyethyl (meth)acrylate, 4-tert-butylstyrene, and mixtures thereof. Other UV curable oligomers and monomers include, without limitation, di- and tri-functional acrylate and methacrylate derivatives, e.g., 1,6-hexanediol diacrylate, tripropylene glycol diacrylate, and ethoxylated bis-phenol-A diacrylates.

One specific example of a suitable polymer matrix is Nor-Cote CDG-1000 (a mixture of UV curable acrylate monomers and oligomers) which contains a photoinitiator (hydroxy ketone) and organic solvent acrylates (e.g., methyl methacrylate, hexyl methacrylate, beta-phenoxy ethyl acrylate, and hexamethylene acrylate), available from Nor-Cote. Other suitable components for polymer matrix materials can include, but are not limited to, acrylated polyester oligomers, such as CN293 and CN294 as well as CN-292 (low viscosity polyester acrylate oligomer), SR-351 (trimethylolpropane triacrylate), SR-395 (isodecyl acrylate) and SR-256 (2(2-ethoxyethoxy) ethyl acrylate), all of which are available from Sartomer Co.

Other Optional Ingredients

The color forming compositions of the present invention can also include various additional components such as colorants, liquid vehicles, stabilizers, anti-fade agents, plasticizers, binders, and other additives known to those skilled in the art.

In certain embodiments of the present invention, it is sometimes desirable to add a plasticizer to improve coating flexibility, durability, and coating performance. Plasticizers can be either solid or liquid plasticizers. Such suitable plasticizers are well known to those skilled in the art, as exemplified in U.S. Pat. No. 3,658,543, which is incorporated herein by reference in its entirety. Specific examples of plasticizers include, but are not limited to, cellulose esters such as an o-phenyl phenol ethylene oxide adduct (commercially available as MERPOL 2660 from E.I. Du Pont de Nemours & Co., Wilmington, Del.), polyethylene glycols and substituted phenolethylene oxide adducts such as nonylphenoxypoly(ethyleneoxy)-ethanol (commercially available as IGEPAL CO 210 from Aldrich Chemical Co.), acetates, butyrates, cellulose acetate butyrates, and mixtures thereof. The plasticizer can be included with either or both of the polymer matrix and the color former.

Other additives can also be utilized for producing particular commercial products such as including a colorant to impart additional desired color to the image. The colorants can be color formers which are developed at other wavelengths not used by the fluoran leuco dye or non-leuco colorants which can provide a background color. In one embodiment, optional colorants can be standard pigments and/or dyes. For example, the use of an opacifier pigment or other colorant can provide background color to the substrate. The optional colorants can be added to the color forming composition, underprinted, or overprinted, as long as the development of the color former is not prevented from at least some development due to the presence of the optional colorant.

In one embodiment, the color forming composition can be prepared in a solution which is substantially transparent or translucent. Any suitable liquid carrier, e.g., an alcohol with a surfactant, can be used which is compatible with a particular color former, polymer matrix, and/or other components chosen for use. The liquid carrier can include, but is not limited to, solvents such as methylethyl ketone, isopropyl alcohol or other alcohols and diols, water, surfactants, and mixtures thereof. When the color forming composition is prepared in a solution form, it may be desirable to underprint a colored coating over at least a portion of the substrate beneath the color forming composition. The optional colored coating produces a background color that can be visible underneath the solution layer. This colored coating can contain various colorants such as other pigments and/or dyes.

The color forming composition can be prepared in a number of ways for application to a substrate. Often, the liquid carrier can be used which can be at least partially removed through known solvent removal processes. Typically, at least a portion of the liquid carrier can be driven off or allowed to evaporate after the coating process is complete. Further, various additional components, such as lubricants, surfactants, and materials imparting moisture resistance, can also be added to provide mechanical protection to the color forming composition. Other overcoat compositions can also be used and are well known to those skilled in the art.

In one aspect of the present invention, the color forming composition can be spin-coatable. In order to provide desirable color forming properties and spin-coatability, various factors such as viscosity and solids content can also be considered. The color forming compositions of the present invention can have less than about 10 wt % of solids, which typically provides good coating properties. For example, in one aspect, the solids content of a spin-coatable color forming composition can be from about 5 wt % to about 9 wt %. In another aspect, the color forming composition can have a viscosity of less than 100 cps before coating.

Radiation Application for Development

In one embodiment of the present invention, the color forming composition can be applied to a substrate. The composition can be applied to the substrate using any known technique such as spin-coating, screen printing, sputtering, spray coating, ink-jetting, or the like. A variety of substrates can be used such as an optical disk, polymeric surface, glass, ceramic, metal, or paper. In one embodiment, the color forming composition can be applied to an optical disk and select portions thereof developed using a laser or other radiation source.

Once the color forming composition is applied to the substrate, the conditions under which the color forming compositions of the present invention are developed can be varied.

For example, one can vary the electromagnetic radiation wavelength, heat flux, and exposure time. The amount of energy which is to be applied depends partially on the activation energy of the development reaction of the color former and the specific radiation absorber chosen. However, the energy applied is typically sufficient to develop the color former without also decomposing the color forming composition or damaging the substrate. Such an energy level is typically well below the energy required for decomposition of the color forming composition. Variables such as spot size, focus, and laser power will also affect any particular system design and can be chosen based on the desired results. With these variables fixed at predetermined values, the radiation source can then direct electromagnetic radiation to the color forming composition in accordance with data received from a signal processor. Further, color former and/or radiation absorber concentration and proximity to one another can also be varied to affect the development times and the optical density of the developed image.

Typically, an image to be formed on the surface can be digitally stored and then rasterized or spiralized. The resulting data can be delivered to a radiation source which exposes portions of the color forming composition to radiation while the optical disk is spinning. Any number of electromagnetic radiation sources can be used. Lasers provide a simple and effective way of delivering focused and highly controlled pulsed light at a desired wavelength such as from about 200 nm to about 1100 nm The color forming compositions of the present invention can be developed using lasers having from about 15 to 100 mW power usage, although lasers having a power outside this range can also be used. Typically, lasers having from about 30 mW to about 50 mW are readily commercially available and work well using the color forming composition described herein. The spot size generated by the laser can be determined by radiation that contacts the substrate at a single point in time. The spot size can be circular, oblong, or other geometric shape, and can range from about 1 μm to about 200 μm along a largest dimension and often from about 10 μm to about 60 μm, though smaller or larger sizes can also be used. In a further aspect, spot sizes of 20 μm by 50 μm, as measured across perpendicular major and minor axes, can provide a good balance between resolution and developing speed.

Heat flux is a variable that can be altered as well, and can be from about 0.05 to 5.0 $J/cm^2$ in one embodiment, and from about 0.3 to 0.5 $J/cm^2$ in a second embodiment. In general, a heat flux of less than 0.5 $J/cm^2$ can also be used. The color forming compositions of the present invention can be optimized by adjusting the concentrations and type of radiation absorber, color former, and polymer matrix. Heat flux in these ranges allow for development of color formers in optimized compositions in from about 10 μsec to about 100 μsec per dot in some embodiments. Further, the color forming compositions of the present invention can be optimized for development in less than about 1 millisecond, and in some embodiments less than about 500 μsec. In some embodiments, the color forming compositions of the present invention can be optimized for development in from about 100 μsec to about 500 μsec. Those skilled in the art can adjust these and other variables to achieve a variety of resolutions and developing times. In embodiments where the substrate is an optical disk or other moving substrate, the exposure time will depend on the rate of motion of the substrate. More specifically, in such embodiments, the exposure times above refer the time during which a point on the substrate is exposed to the radiation. For example, a spot size of 50 μm along the direction of rotation will result in a single point on the substrate traveling through the spot starting at one edge and traveling to the opposite edge. The total exposure time is therefore the average time that radiation contacts a particular point on the substrate or color forming composition.

The following example illustrates exemplary embodiments of the invention. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what is presently deemed to be practical embodiments of the invention.

EXAMPLES

The following example illustrates one possible embodiment of the present invention. Thus, this example should not be considered as a limitation of the present invention, but is merely in place to teach how to make one such composition of the present invention.

Example 1

Coating Having a Self-developing Leuco Dye

A self-developing Leuco dye coating is prepared with the components listed in table 1.

TABLE 1

| Components | Wt % |
|---|---|
| Polymethylmethacrylate (PMMA) | 15 |
| Self-Developing Leuco-dye of Formula 4 | 4.5 |
| Radiation Absorber IR780 [3H-Indolium, 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propyl-, iodide(9CI)] | 0.5 |
| Toluene | 40 |
| Tetrahydrofuran (THF) | 40 | where the self-developing Leuco dye has the following structure:

Formula 4

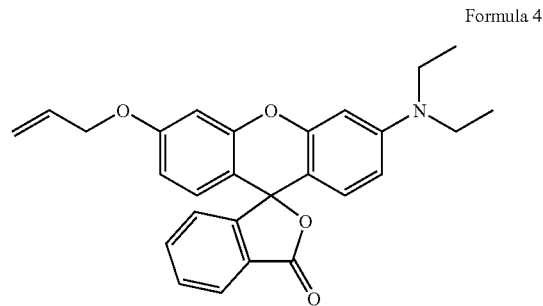

The self-developing Leuco dye, radiation absorber and PMMA is dissolved in THF/Toluene solvent mix. The resulting mix is coated onto glass slides or other substrate, e.g., optical disk. After solvent evaporation, the coating is transparent with slightly greenish color due to visible signature of IR780 radiation absorber. When exposed to 780 nm imaging laser (Power—50 mW, spot diameter—20 um, the exposed area of the coating develops red coloration.

It is to be understood that the above-referenced arrangements are illustrative of the application for the principles of the present invention. Numerous modifications and alternative arrangements can be devised without departing from the spirit and scope of the present invention while the present invention has been described above in connection with the exemplary embodiments(s) of the invention. It will be apparent to those of ordinary skill in the art that numerous modifications can be made without departing from the principles and concepts of the invention as set forth in the claims.

What is claimed is:

1. A color forming composition or composite, comprising
   a) a polymer matrix;
   b) a thermally modifiable fluoran leuco dye comprising a latent developer attached thereto; and
   c) a radiation absorber,
   wherein the thermally modifiable fluoran leuco dye is developable upon the color forming composition being contacted with electromagnetic radiation which causes the radiation absorber to become energized, wherein the energized radiation absorber causes the latent developer to undergo rearrangement to produce an intermediate dye form having a phenolic substituent, wherein the intermediate dye undergoes an acid catalyzed ring opening to produce a colored dye form, wherein the polymer matrix, the thermally modifiable fluoran leuco dye, and the radiation absorber are present in one phase, and wherein the thermally modifiable fluoran leuco dye has the following structure:

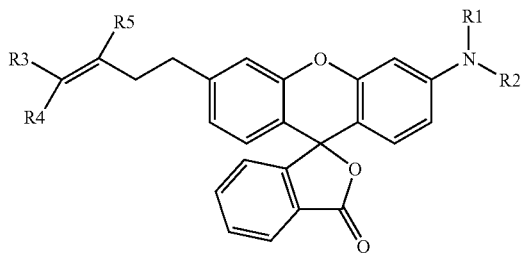

wherein R1, R2, R3, R4, and R5 are independently lower alkyl substituents or hydrogen.

2. The composition or composite of claim 1, wherein the latent developer comprises an allyoxy substituent attached to an aromatic structure.

3. The composition or composite of claim 2, wherein the allyoxy substituent attached to an aromatic structure is configured to undergo a Claisen rearrangement producing the phenolic substituent.

4. The composition or composite of claim 1, the thermally modifiable fluoran leuco dye is modified from the following substructure:

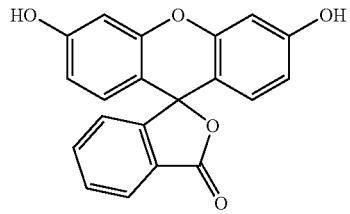

wherein such modification is performed through a hydroxy substituent or an aromatic hydrogen.

5. The composition or composite of claim 1, wherein the thermally modifiable fluoran leuco dye is solvated in the polymer matrix.

6. The composition or composite of claim 1, wherein the thermally modifiable fluoran leuco dye is dispersed within the polymer matrix.

7. The composition or composite of claim 1, wherein the thermally modifiable fluoran leuco dye comprises from about 0.5% to about 50% by volume of the polymer matrix.

8. The composition or composite of claim 1, wherein the radiation absorber is admixed with or in thermal contact with the thermally modifiable fluoran leuco dye.

9. The composition or composite of claim 1, wherein the radiation absorber is admixed with or in thermal contact with the polymer matrix.

10. The composition or composite of claim 1, wherein the radiation absorber is selected from the group consisting aluminum quinoline complexes, porphyrins, porphins, indocyanine dyes, phenoxazine derivatives, phthalocyanine dyes, polymethyl indolium dyes, polymethine dyes, guaiazulenyl dyes, croconium dyes, polymethine indolium dyes, metal complex IR dyes, cyanine dyes, squarylium dyes, chalcogeno-pyryloarylidene dyes, indolizine dyes, pyrylium dyes, quinoid dyes, quinone dyes, azo dyes, and mixtures or derivatives thereof.

11. The composition or composite of claim 1, wherein the radiation absorber is selected from the group consisting of quinoline dyes, porphyrins, porphins, and mixtures or derivatives thereof.

12. The composition or composite of claim 1, wherein the color forming composition has a viscosity below 100 cps prior to coating.

13. The composition or composite of claim 1, wherein the color forming composition is spin-coatable.

14. The composition or composite of claim 1, wherein the color forming composition is developable using radiation at less than about 0.5 J/cm$^2$.

15. The composition or composite of claim 1, wherein the color forming composition is developable in less than about 1 millisecond.

16. The composition or composite of claim 1, wherein the color forming composition is developable with electromagnetic radiation having a wavelength from about 200 nm to about 900 nm.

17. The composition or composite of claim 1, wherein the polymer matrix includes a UV curable polymer.

18. The composition or composite of claim 17, wherein the UV curable polymer is curable at a curing wavelength which is substantially different than the electromagnetic radiation.

19. The composition or composite of claim 17, wherein the UV curable polymer is polymerizecl from monomers selected from the group consisting of isobornyl methacrylate, isobornyl acrylate, dicyclopentadienyl acrylate, dicyclopentadienyl methacrylate, cyclohexyl (meth)acrylate, cyclohexyl acrylate, cyclohexyl (meth)acrylate, dicyclopentanyl (meth)acrylate, tert-butyl acrylate, tert-butyl methacrylate, dicyelopentanyloxyethyl (meth)acrylate, dieyclopentenyloxyethyl (meth)acrylate, 4-tert-butylstyrene, 1,6-hexanediol diacrylate, tripropylene glycol diacrylate, ethoxylated bisphenol-A diacrylates, and derivatives and mixtures thereof 20. The composition or composite of claim 1, further comprising a photoinitiator selected from the group consisting of benzophenone derivatives, thioxanethone derivatives, anthraquinone derivatives, acetophenones, benzoine ethers, and mixtures thereof.

21. The composition or composite of claim 1, coated on a substrate.

22. The composition or composite of claim 21, wherein the substrate is an optical disk.

23. A color forming composition or composite, comprising
a) a polymer matrix;
b) a thermally modifiable fluoran leuco dye comprising a latent developer attached thereto, and having the following structure:

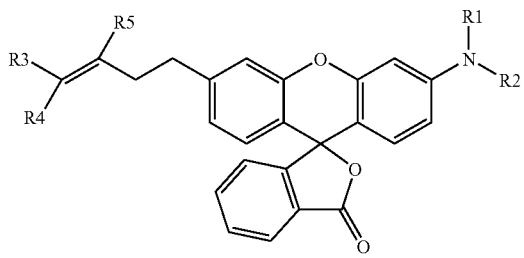

wherein R1, R2, R3, R4, and R5 are independently lower alkyl substituents or hydrogen; and
c) a radiation absorber,
wherein the thermally modifiable fluoran leuco dye is developable upon the color forming composition being contacted with electromagnetic radiation which causes the radiation absorber to become energized, wherein the energized radiation absorber causes the latent developer to undergo rearrangement to produce an intermediate dye form having a phenolic substituent, wherein the intermediate dye undergoes an acid catalyzed ring opening to produce a colored dye form.

24. A method of labeling a substrate, comprising:
a) providing a substrate having a color forming composition coated thereon, said color forming composition, comprising:
i) a polymer matrix;
ii) a thermally modifiable fluoran leuco dye comprising a latent developer attached thereto, and having the following structure:

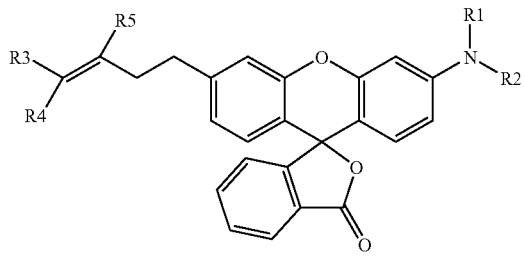

wherein R1, R2, R3, R4, and R5 are independently lower alkyl substituents or hydrogen; and
iii) a radiation absorber,
wherein the thermally modifiable fluoran leuco dye is developable upon the color forming composition being contacted with electromagnetic radiation which causes the radiation absorber to become energized, wherein the energized radiation absorber causes the latent developer to undergo rearrangement to produce an intermediate dye form having a phenolic substituent, wherein the intermediate dye undergoes an acid catalyzed ring opening to produce a colored dye form; and
b) directing electromagnetic energy from an electromagnetic radiation source onto the color forming composition at a wavelength and power level for a sufficient amount of time to cause the radiation absorber to generate enough heat to form the colored dye form.

* * * * *

UNITED STATES PATENT AND TRADEMARK OFFICE
CERTIFICATE OF CORRECTION

PATENT NO. : 7,582,408 B2
APPLICATION NO. : 11/796630
DATED : September 1, 2009
INVENTOR(S) : Vladek Kasperchik et al.

It is certified that error appears in the above-identified patent and that said Letters Patent is hereby corrected as shown below:

In column 10, line 59, delete "thioxanethone" and insert -- thioxanthone --, therefor.

In column 10, line 60, delete "benzoine" and insert -- benzoin --, therefor.

In column 15, line 47, in Claim 2, delete "allyoxy" and insert -- allyloxy --, therefor.

In column 15, line 50, in Claim 3, delete "allyoxy" and insert -- allyloxy --, therefor.

In column 15, line 53, in Claim 4, before "the" insert -- wherein --.

In column 16, line 51, in Claim 19, delete "polymerizecl" and insert -- polymerized --, therefor.

In column 16, line 57, in Claim 19, delete "dicyelopentanyloxyethyl" and insert -- dicyclopentanyloxyethyl --, therefor.

In column 16, lines 57-58, in Claim 19, delete "dieyclopentenyloxyethyl" and insert -- dicyclopentenyloxyethyl --, therefor.

In column 16, line 60, in Claim 19, delete "thereof" and insert -- thereof. --, therefor.

In column 16, line 63, in Claim 20, delete "thioxanethone" and insert -- thioxanthone --, therefor.

In column 16, line 64, in Claim 20, delete "benzoine" and insert -- benzoin --, therefor.

In column 16, line 67, in Claim 21, delete "substratc." and insert -- substrate. --, therefor.

In column 18, line 16, in Claim 24, delete "R1,R2," and insert -- R1, R2, --, therefor.

Signed and Sealed this

Twenty-third Day of November, 2010

David J. Kappos
*Director of the United States Patent and Trademark Office*